(12) United States Patent
Palmer et al.

(10) Patent No.: US 6,295,461 B1
(45) Date of Patent: Sep. 25, 2001

(54) MULTI-MODE RADIO FREQUENCY NETWORK SYSTEM

(75) Inventors: Brian G. Palmer, Redmond; Alan F. Jovanovich, Des Moines, both of WA (US)

(73) Assignee: Intermec IP Corp., Woodland Hills, CA (US)

(*) Notice: Subject to any disclaimer, the term of this patent is extended or adjusted under 35 U.S.C. 154(b) by 0 days.

(21) Appl. No.: 08/962,908

(22) Filed: Nov. 3, 1997

(51) Int. Cl.[7] ...................................................... H04B 1/38
(52) U.S. Cl. ............................ 455/557; 455/403; 455/426
(58) Field of Search ............................ 455/11.1, 557, 455/403, 131; 395/800; 375/202; 340/870.02, 539

(56) References Cited

U.S. PATENT DOCUMENTS

| | | | |
|---|---|---|---|
| 3,879,580 | * 4/1975 | Schlosser et al. | 179/15 |
| 5,022,046 | 6/1991 | Morrow, Jr. . | |
| 5,166,664 | * 11/1992 | Fish | 340/539 |
| 5,276,680 | * 1/1994 | Messenger | 370/85.1 |
| 5,291,516 | 3/1994 | Dixon et al. . | |
| 5,315,617 | * 5/1994 | Guida et al. | 375/39 |
| 5,438,329 | * 8/1995 | Gastouniotis et al. | 340/870.02 |
| 5,448,593 | 9/1995 | Hill . | |
| 5,491,457 | 2/1996 | Feher . | |
| 5,668,828 | * 9/1997 | Sanderford, Jr. et al. | 375/202 |
| 5,680,633 | * 10/1997 | Koenck et al. | 395/800 |
| 5,909,193 | * 6/1999 | Phillips et al. | 342/410 |
| 6,011,784 | * 1/2000 | Brown et al. | 370/329 |
| 6,122,263 | * 9/2000 | Dahlin et al. | 370/329 |

FOREIGN PATENT DOCUMENTS

WO 97/32403    9/1997  (WO) .

OTHER PUBLICATIONS

A High–Speed Wireless LAN by Skellern et al., IEEE Micro, Jan./Feb. 1997, pp. 40–47.

Wireless LAN Design Alternatives by Bantz et al., IEEE Network, Mar./Apr. 1994, pp. 43–53.

* cited by examiner

Primary Examiner—Daniel Hunter
Assistant Examiner—C. Chow
(74) Attorney, Agent, or Firm—O'Melveny & Myers LL

(57) ABSTRACT

A multi-mode radio frequency network comprises a first type of computing device having a radio receiver/transmitter adapted for communication over a narrowband frequency range, and a second type of computing device having a radio receiver/transmitter adapted for communication over both the narrowband frequency range and a wideband frequency range. A network access controller is adapted for communication with both types of computing device over respective ones of the narrowband and wideband frequency ranges. The network access controller provides synchronization signals for coordinating the timing of communications over the narrowband and wideband frequency ranges. The second type of computing device may be adapted for either frequency-hopping or direct sequence spread spectrum communication signals over the wideband frequency range. The synchronization signals further comprise periodic beacon signals that define discrete time periods which further include a synchronous portion for communication of the narrowband signals and an asynchronous portion for communication of the wideband signal. The multi-mode radio frequency network may further include data storage/retrieval devices and data collection devices adapted for communication with the first and second types of computing device over the narrowband frequency range.

19 Claims, 3 Drawing Sheets

MULTI-MODE RADIO FREQUENCY NETWORK SYSTEM

BACKGROUND OF THE INVENTION

1. Field of the Invention

The present invention relates to computing devices coupled together into a wireless local area network, and more particularly, to a wireless local area network infrastructure that permits communication in plural modes to support both wideband spread spectrum and narrowband radio frequency signals.

2. Description of Related Art

A wireless local area network (WLAN) comprises a plurality of remote computing devices which communicate together over radio frequency (RF) signals. As in a wired local area network (LAN), the WLAN allows users to seamlessly access disk drives, printers, and additional computer resources and systems connected to the WLAN. The remote computing devices include a radio receiver/transmitter adapted for RF communication with the other elements of the WLAN. The WLAN may also include a central host processing unit that sends information to and receives information from any one of the plurality of remotely disposed computing devices. The central host processor may also form part of a separate wired LAN to provide a bridge with the WLAN. In such a WLAN, the remote computing devices may comprise portable units that operate within a defined environment to report information back to the central host processing unit. WLAN systems offer increased flexibility over wired LAN systems by enabling operators of the remote computing devices substantial freedom of movement through the environment, and are particularly useful for remote data collection applications such as inventory control, manufacturing and production flow management, and asset tracking.

For simplicity, the radio receiver/transmitter provided within each remote computing device may communicate using conventional narrowband RF signals. Narrowband RF operation has a significant drawback in that the radio receiver/transmitter must be operated at relatively low power levels in order to ensure compliance with certain governmental regulations, and at such low power levels the RF signals are highly susceptible to interference and have low data throughput rates. To overcome these and other drawbacks, commercial WLAN systems have adopted so-called "spread spectrum" modulation techniques. In a spread spectrum system, the transmitted signal is spread over a frequency band that is significantly wider than the minimum bandwidth required to transmit the information being sent. As a result of the signal spreading, spread spectrum systems enable high data integrity and security. Moreover, by spreading transmission power across a broad bandwidth, power levels at any given frequency within the bandwidth are significantly reduced, thereby reducing interference to other radio devices.

In one type of spread spectrum communication system, an RF carrier is shifted in discrete increments in a pattern dictated by a predetermined sequence. These spread spectrum systems are known as "frequency-hopping" modulation systems, since the transmitter jumps from frequency to frequency in accordance with the predetermined sequence. The information signal is modulated onto the shifting carrier frequencies using frequency shift keying (FSK) modulation. Another type of spread spectrum communication system utilizes an RF carrier modulated by a digital code sequence having a spreading code rate, or chipping rate, much higher than the clock rate of the information signal. These spread spectrum systems are known as "direct sequence" modulation systems. The RF carrier may be modulated such that a data stream has one phase when a spreading code sequence represents a data "one" and 180° phase shift when the spreading code sequence represents a data "zero." The RF carrier may also be binary or quadrature modulated by one or more data streams such that the data streams have one phase when a spreading code sequence represents a data "one" and a predetermined phase shift (e.g., 180° for binary, and 90° for quadrature) when the spreading code sequence represents a data "zero." These types of modulation are commonly referred to as binary shift key (BPSK) and quadrature shift key (QPSK) modulation, respectively.

A primary drawback of operating a WLAN using spread spectrum communication is the high cost of the computing devices due primarily to the complexity of the radio receiver/transmitter. For certain applications, a narrowband RF radio receiver/transmitter would provide satisfactory performance while the high data throughput and integrity provided by a wideband spread spectrum radio receiver/transmitter would be unnecessary. Nevertheless, it would be costly and impractical to operate two separate narrowband and wideband WLAN systems simultaneously. As a result, WLAN system designers must select a single communication mode that provides a sufficient level of performance within practical cost parameters.

Thus, it would be highly desirable to provide a WLAN infrastructure that permits multi-mode communication over both wideband spread spectrum and narrowband RF signals. Such a multi-mode WLAN could be constructed using a combination of higher performance computing devices communicating using wideband spread spectrum RF signals and lower performance computing devices communicating using narrowband RF signals.

SUMMARY OF THE INVENTION

In accordance with the teachings of the present application, a multi-mode radio frequency network is provided. The multi-mode radio frequency network permits RF communication using both wideband spread spectrum RF signals and narrowband RF signals.

More particularly, the multi-mode radio frequency network comprises a first type of computing device having a radio receiver/transmitter adapted for communication over a narrowband frequency range, and a second type of computing device having a radio receiver/transmitter adapted for communication over both the narrowband frequency range and a wideband frequency range. A network access controller is adapted for communication with both types of computing device over respective ones of the narrowband and wideband frequency ranges. The network access controller provides synchronization signals for coordinating the timing of communications over the narrowband and wideband frequency ranges. The second type of computing device may be adapted for either frequency-hopping or direct sequence spread spectrum communication signals over the wideband frequency range. The synchronization signals further comprise periodic beacon signals that define discrete time periods which further include a synchronous portion for communication of the narrowband signals and an asynchronous portion for communication of the wideband signal. The multi-mode radio frequency network may further include data storage/retrieval devices and data collection devices adapted for communication with the first and second types of computing device over the narrowband frequency range.

In a first embodiment of the invention, the second radio receiver/transmitter is adapted to receive frequency-hopping spread spectrum communication signals in addition to narrowband communication signals. A receive section is adapted to receive radio frequency (RF) signals over the wideband and the narrowband frequency ranges and having a dowconversion mixer to mix the RF signals with a frequency-shifted carrier signal to downconvert the RF signals to intermediate frequency (IF) signals. An IF filter section is adapted to receive the IF signals and has a wideband bandpass filter and a narrowband bandpass filter that are alternatively coupled to the IF signals to provide filtered IF signals. A demodulation section is adapted to receive the filtered IF signals and recover wideband and narrowband receive signals therefrom. A synthesizer section is adapted to generate the frequency-shifted carrier for the receive section. The frequency-shifted carrier is further modulated by wideband and narrowband transmit data signals to provide modulated transmit signals, and a transmit section is adapted to transmit the modulated transmit signals.

In a second embodiment of the invention, the second radio receiver/transmitter is adapted to receive direct sequence spread spectrum communication signals in addition to narrowband communication signals. A receive section is adapted to receive radio frequency (RF) signals and has a downconversion mixer to mix the RF signals with a carrier signal to downconvert the RF signals to intermediate frequency (IF) signals. A demodulation section receives the filtered IF signals and provides in-phase and quadrature receive data signals therefrom. A synthesizer section generates the carrier for the receive section, and the carrier is further modulated by in-phase and quadrature transmit data signals. A transmit section transmit the modulated transmit signals. Lastly, a control section controls the switching between wideband and narrowband modes of the second radio receiver/transmitter in which the in-phase and quadrature receive signals comprise wideband data in the wideband mode of the second radio receiver/transmitter, and the in-phase receive signals comprise narrowband data in the narrowband mode of the second radio receiver/transmitter.

A more complete understanding of the multi-mode radio frequency network will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 4 is a timing diagram illustrating synchronous and asynchronous communication periods following a periodic beacon.

DETAILED DESCRIPTION OF THE PREFERRED EMBODIMENT

Figure 1:
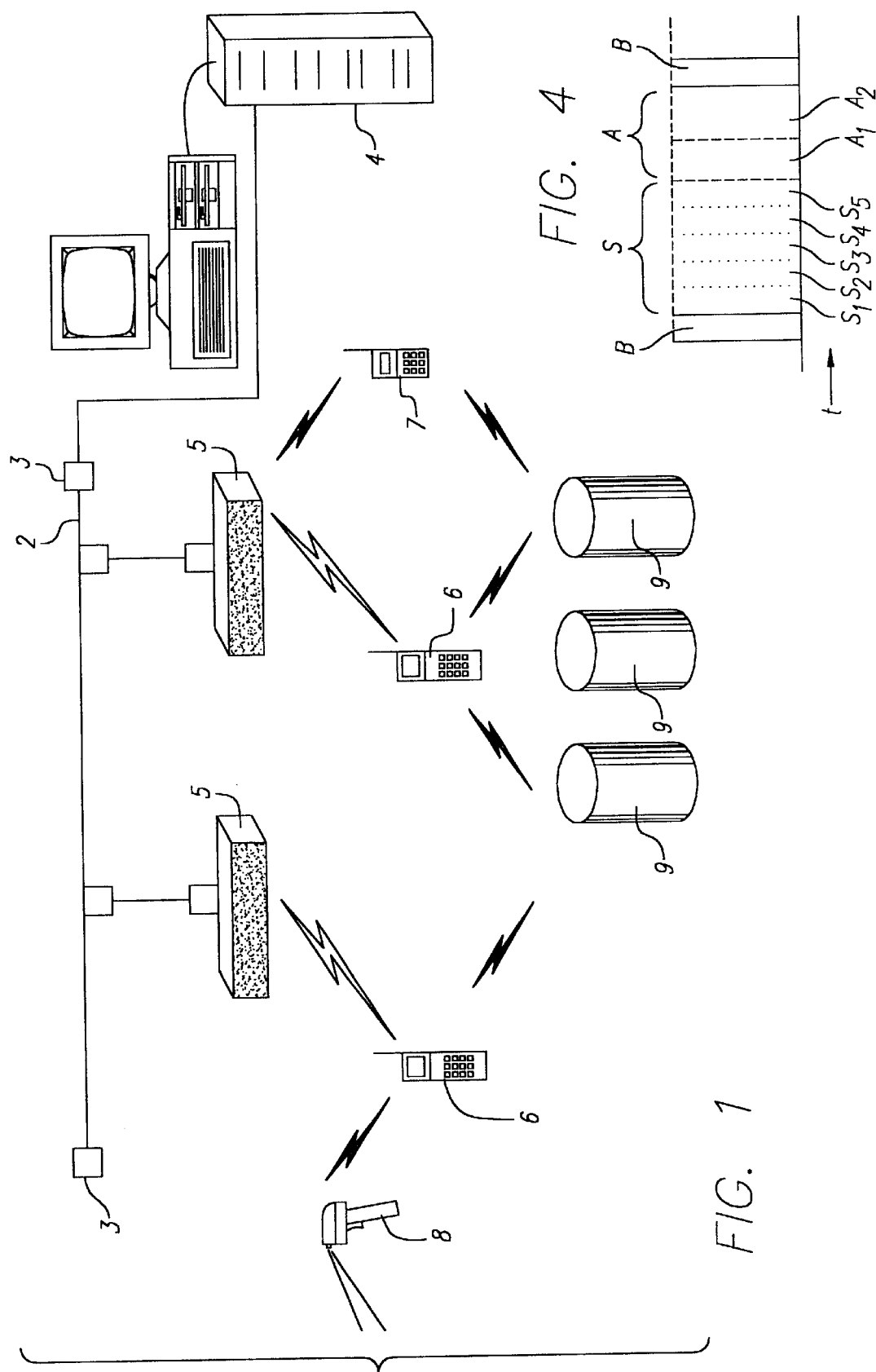
FIG. 1 is a system diagram illustrating a multi-mode WLAN of the present invention which includes a first type of computing device using wideband RF communication signals and second type of computing device using narrowband RF communication signals.

The present invention satisfies the need for a multi-mode WLAN infrastructure that supports both wideband spread spectrum and narrowband radio frequency signals. The multi-mode WLAN can be constructed using a combination of higher performance computing devices communicating using wideband spread spectrum RF signals and lower performance computing devices communicating using narrowband RF signals. In the detailed description that follows, it should be appreciated that like reference numerals are used to identify like elements illustrated in one or more of the figures.

Referring first to FIG. 1, a system diagram of a multi-mode WLAN of the present invention is illustrated. The multi-mode WLAN includes a wired medium 2 having a plurality of interconnected nodes 3. At one of the nodes 3, a central computer controller 4 is coupled thereto which acts as a server for the WLAN and controls communications between the nodes on the wired medium 2. Two of the nodes 3 have access points 5 coupled thereto which permit communication between the wired medium 2 and the wireless computing devices of the WLAN that will be described in greater detail below. The access points 5 include an RF receiver/transmitter that communicates between the wired medium 2 and the wireless computing devices. As known in the art, information transmitted on the wired medium 2 may be in the form of data packets in accordance with well established computer network protocols, such as Ethernet or Token Ring. It should also be appreciated that other computer network elements, such as computers, servers, printers, and data storage devices may be coupled to other nodes 3 of the wired medium 2.

The WLAN further includes a multi-mode computing device 6, a single-mode computing device 7, data collection devices 8, and data storage/retrieval devices 9. The multi-mode computing device 6 comprises a multi-mode RF receiver/transmitter adapted to communicate both narrowband RF signals and wideband RF signals. The single-mode computing device 7 comprises a single-mode RF receiver/transmitter adapted to communicate only narrowband RF signals. Both the multi-mode and single-mode computing device 6, 7 have generally similar external features, such as a keypad, a data display, and an antenna; however, it is anticipated that the multi-mode computing device 6 be more sophisticated and have greater internal data processing capability than the single-mode computing device 7. For example, the multi-mode computing device 6 may include a faster central processing unit (CPU) and greater memory storage capacity than the single-mode computing device 7, and similarly, may have a larger or more complete keypad and/or data display. For these reasons, it is anticipated that the multi-mode computing device 6 be utilized by supervisory level users and the single-mode computing device 7 be utilized by ordinary level users.

The data collection devices 8 comprise conventional bar code readers used to convert information encoded in bar code symbols into electronic data signals. As known in the art, such data collection devices 8 typically include a light source adapted to be scanned across the bar code field, such as provided by a laser or light emitting diode (LED). The bar and space elements of the bar code symbol have different light reflectivity, and the information encoded into the bar code may thus be detected in the reflected light therefrom. Alternatively, the data collection devices 8 may collect an image of the bar code using an electro-optical imaging element, such as a charge coupled device (CCD), allowing the information encoded into the bar code symbol to be interpreted from the collected image. The data collection devices 8 are adapted to communicate with the computing devices 6, 7 via narrowband RF signals, or alternatively, may be directly coupled to the computing devices via an electrical cable.

The data storage/retrieval devices 9 comprise conventional magnetic disk or tape drives used for non-volatile data storage. The data storage/retrieval devices 9 are adapted to communicate with the computing devices 6, 7 via narrowband RF signals. Data collected by the computing devices 6, 7 may thus be downloaded to the data storage/retrieval devices 9 during the course of data collection operations, or alternatively, data stored in the data storage/retrieval devices may be accessed by the computing devices 6, 7. As a result, the data storage capacity of the computing devices 6, 7 can be reduced accordingly.

To operate the multi-mode WLAN, the access points 5 transmit periodic beacon signals that enable all the wireless elements of the WLAN to synchronize. As shown in FIG. 4, the periodic beacon signals (B) indicate the start of a time period during which RF communication will occur. This time period is divided into a synchronous communication period (S) and an asynchronous communication period (A). The synchronous communication period is further subdivided into fixed-length time slots $S_1$–$S_6$ which allow the multi-mode computing device 6 to sequentially poll the data storage retrieval devices 9, the single-mode computing device 7, and the data collection devices 8 via narrowband RF communication signals. Also, the single-mode computing device 7 communicates with the access point 5 via narrowband RF communication signals during one of the time slots. It is anticipated that the synchronous RF communication signals be transmitted using a common system clock that is synchronized to the periodic beacon signals.

During the asynchronous communication period, the multi-mode computing devices 6 communicate with the access points 5 over wideband spread spectrum RF communication signals. The spread spectrum RF communication signals may be either of the frequency-hopping or direct sequence variety, as will be further described below. The asynchronous spread spectrum communication signals $A_1$–$A_2$ do not have fixed time duration, but rather such signals are provided in the form of message packets that generally include a header identifying a start of a message and a trailer identifying an end of a message in accordance with known data protocols.

Figure 2:
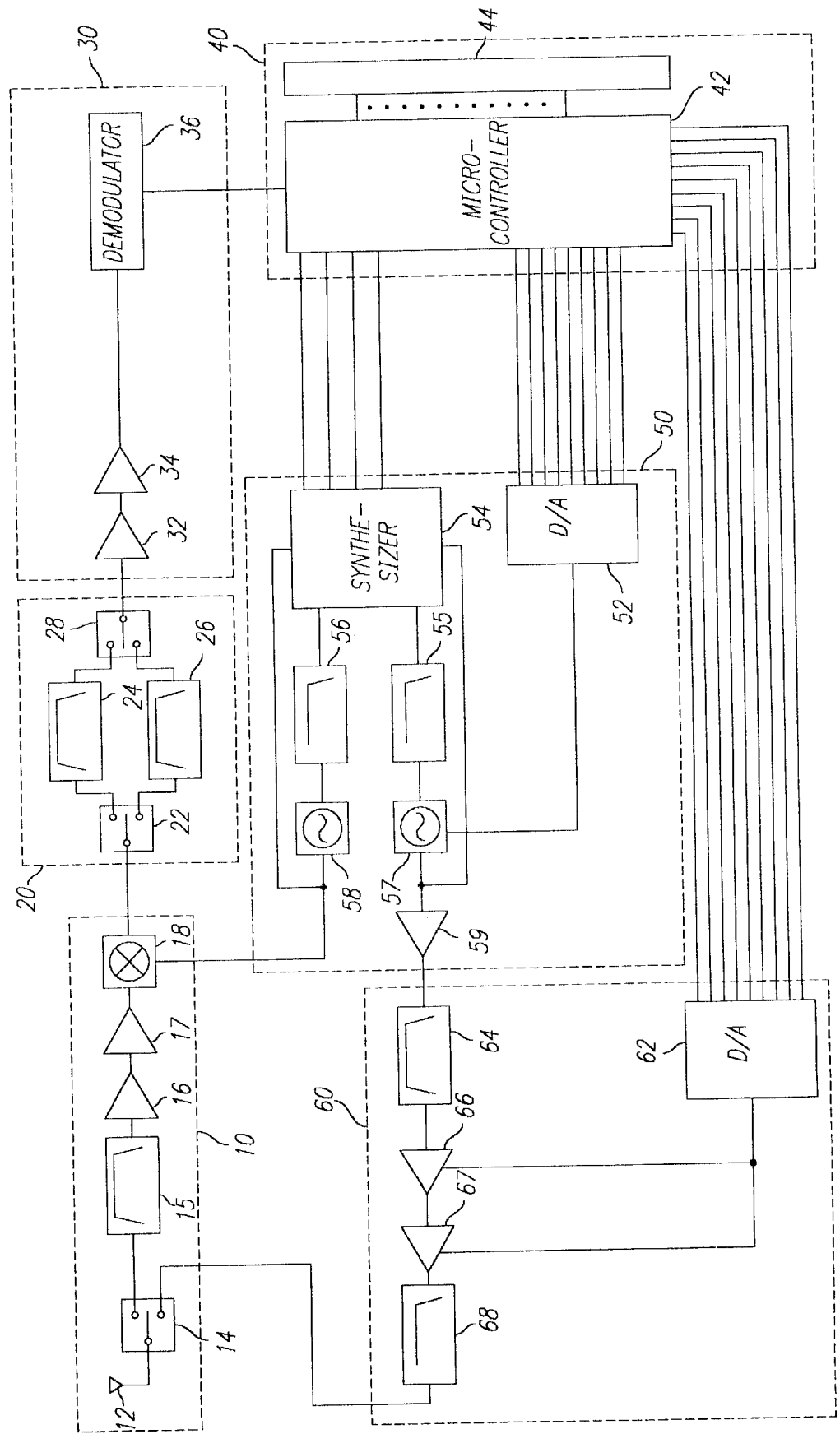
FIG. 2 is a block diagram illustrating a first embodiment of a multi-mode radio receiver/transmitter adapted for frequency-hopping spread spectrum communication.

Referring now to FIG. 2, an embodiment of the multi-mode RF receiver/transmitter included in the multi-mode computing device 6 is illustrated. In accordance with this embodiment, the multi-mode RF receiver/transmitter is adapted to communicate both narrowband RF signals and wideband frequency-hopping spread spectrum RF signals. The multi-mode RF receiver/transmitter of FIG. 2 includes an RF receive section 10, an IF filter section 20, a demodulation section 30, a digital control section 40, a synthesizer section 50 and a transmit section 60.

The RF receive section 10 includes an antenna 12, a transmit/receive switch 14, a bandpass filter 15, low noise amplifier stages 16, 17, and a downconversion mixer 18. The antenna 12 is provided for receiving and transmitting RF signals to and from the receiver/transmitter. The transmit/receive switch 14 has a common terminal that is electrically coupled to the antenna 12, and two contact positions electrically coupled to the bandpass filter 14 of the receive circuit and transmit circuit 60 (described below), respectively. The transmit/receive switch 14 enables the antenna 12 to be configured for either transmitting or receiving operations. As known in the art, the transmit/receive switch 14 can be provided by mechanical switch elements, such as a relay, or can comprise solid state switching circuitry. It is preferable that the transmit/receive switch 14 have generally high speed switching characteristics to reduce delays between respective receiving and transmitting operations. Within the receive section 10, a received RF signal is first provided to a bandpass filter 15 which rejects adjacent extraneous frequencies outside the bandwidth of the received signal. The low noise amplifier stages 16, 17 amplify the received and filtered signal to a desired amplitude level. The mixer 18 multiplies the amplified signal with a locally generated frequency-shifted carrier from the synthesizer section 50 to produce an intermediate frequency (IF) signal having a constant difference in frequency between the received signal and the locally generated signal.

In the IF filter section 20, the IF signal is provided to one of two bandpass filters depending on whether the received RF signal is a synchronous narrowband signal or an asynchronous wideband signal. The IF filter section 20 includes a first bandpass filter 24 and a second bandpass filter 26 coupled in parallel between two switch stages 22, 28. The first bandpass filter 24 is for reception of wideband frequency-hopping spread spectrum signals, and the second bandpass filter 26 is for reception of narrowband signals. It should be appreciated that the bandwidth of the first bandpass filter 24 represents that of a single frequency channel within the wideband frequency range over which frequency-hopping spread spectrum signals are transmitted, and not the bandwidth of the entire wideband frequency range. The switches 22, 28 are controlled by the digital control section 40 (described below), so that the first bandpass filter 24 is enabled during asynchronous communication periods and the second bandpass filter 26 is enabled during synchronous communication periods.

Following the IF filter section 20, the filtered IF signal is provided to the demodulation section 30 which recovers the information contained within the original RF signal. The IF demodulation section 30 comprises an IF amplifier 32, an IF limiter 34, and a demodulator 36. The IF amplifier 32 and IF limiter 34 are used to adjust the signal level of the filtered IF signal to a level sufficient for demodulation. The gain of these stages may be set at different levels depending on whether the received RF signal is a wideband or narrowband signal. The demodulator 36 is adapted to recover both frequency shift key (FSK) modulated signals from a frequency-hopping spread spectrum wideband signal, and frequency modulation (FM) from a synchronous narrowband signal. A single demodulator circuit could be utilized to demodulate both wideband and narrowband signals either by dynamically changing the circuit's quality factor Q, or by accepting a decreased signal to noise ration for the narrowband signal. Alternatively, separate demodulator circuits could be used for the narrowband and wideband signals that are selectively switched in the same manner as the IF filter section 20.

The digital control section 40 provides the main signal processing hardware for the radio receiver/transmitter, and is responsible for controlling the transmit/receive switching, bandwidth selection, frequency synthesizer programming, clock recovery and data handling/generation. The digital control section 40 comprises a microcontroller 42 and a host interface 44. The microcontroller 42 may be provided by an application specific integrated circuit (ASIC), a microprocessor, a digital signal processor or other such circuit element. The host interface 44 provides for communication between the receiver/transmitter portion of the computing device and a host portion that processes and utilizes the information that has been communicated. As known in the art, the microcontroller 42 performs its functions by executing a series of commands or instructions, also referred to as a software program, that may be disposed on a permanent storage medium, such as a semiconductor read only memory (ROM) device or a magnetic medium.

The synthesizer section 50 communicates with the digital control section 40 to control the timing and selection of carrier frequencies. The synthesizer section 50 comprises a digital-to-analog (D/A) converter 52, a frequency synthesizer 54, a transmit loop filter 55, a receive loop filter 56, a transmit local oscillator 57, a receive local oscillator 58 and a voltage controlled oscillator 46. The frequency synthesizer 54 is programmed by a plurality of digital data signals from the microcontroller 42, and provides a D.C. voltage signal to the transmit and receive local oscillators 57, 58 that corresponds to a selected frequency. The transmit and receive loop filters 55, 56 comprise low pass filters that remove high frequency noise from the D.C. voltage signals that occurs in the feedback loop. The transmit and receive local oscillators 57, 58 further comprise voltage controlled oscillator (VCO) circuits that receive the D.C. voltage signals, and generate corresponding oscillating signals at the selected frequency. The oscillating signals from the transmit and receive local oscillators 57, 58 are also provided back to the frequency synthesizer 54 as feedback signals, as known in the art.

The oscillating signal from the receive local oscillator 58 is provided to the mixer 18 of the receive section 10 as the frequency-shifted carrier. Digital data from the microcontroller 42 is converted to an analog signal by the D/A converter 52, which is provided to the transmit local oscillator 57 to control the waveshape (i.e., amplitude and frequency) of the oscillating signal. By changing the frequency of the oscillating signal, multiple data rates can be supported. Also, by changing the amplitude of the oscillating signal, the frequency deviation of the transmitted carrier can be changed, allowing modulation of both wideband and narrowband data. The modulated oscillating signal from the transmit local oscillator 57 passes through a VCO buffer amplifier 59, and is provided to the transmit section 60.

The transmit section 60 essentially reverses the process performed by the receive section 10. The data-modulated, frequency-shifted carrier passes through a bandpass filter 64 to remove any VCO harmonics generated by the synthesizer section 50. Thereafter, the data-modulated, frequency-shifted carrier is provided to a pre-driver 66 and a power amplifier 67 that amplify the carrier signal to a desired output level, and a low pass filter 68 for noise attenuation. Lastly, the amplified carrier signal is provided to the antenna 12 for RF transmission. It should be appreciated that the pre-driver 66 and amplifier 67 stages need not be linear amplifiers due to the constant envelope modulation, thereby making them more efficient than linear counterparts.

The transmit section 60 further includes a D/A converter 62 that modifies the characteristics of the pre-driver 66 and power amplifier 67. The microcontroller 42 calculates a digital offset value for the transmit section 60 based on the frequency generated by the synthesizer section 50, in order to maintain an optimum power output level of the radio receiver/transmitter for each of the shifted frequencies across the wideband frequency range. The digital offset value is provided to the D/A converter, which provides an analog control signal to bias the pre-driver 66 and power amplifier 67. An example of an RF transmitter that maintains power output level linearity across a range of transmitting frequencies is disclosed in Ser. No. 08/823,611 for ADAPTIVE POWER LEVELING OF AN RF TRANSCEIVER UTILIZING INFORMATION STORED IN NON-VOLATILE MEMORY, filed Mar. 25, 1997, by the assignee herein.

Figure 3:
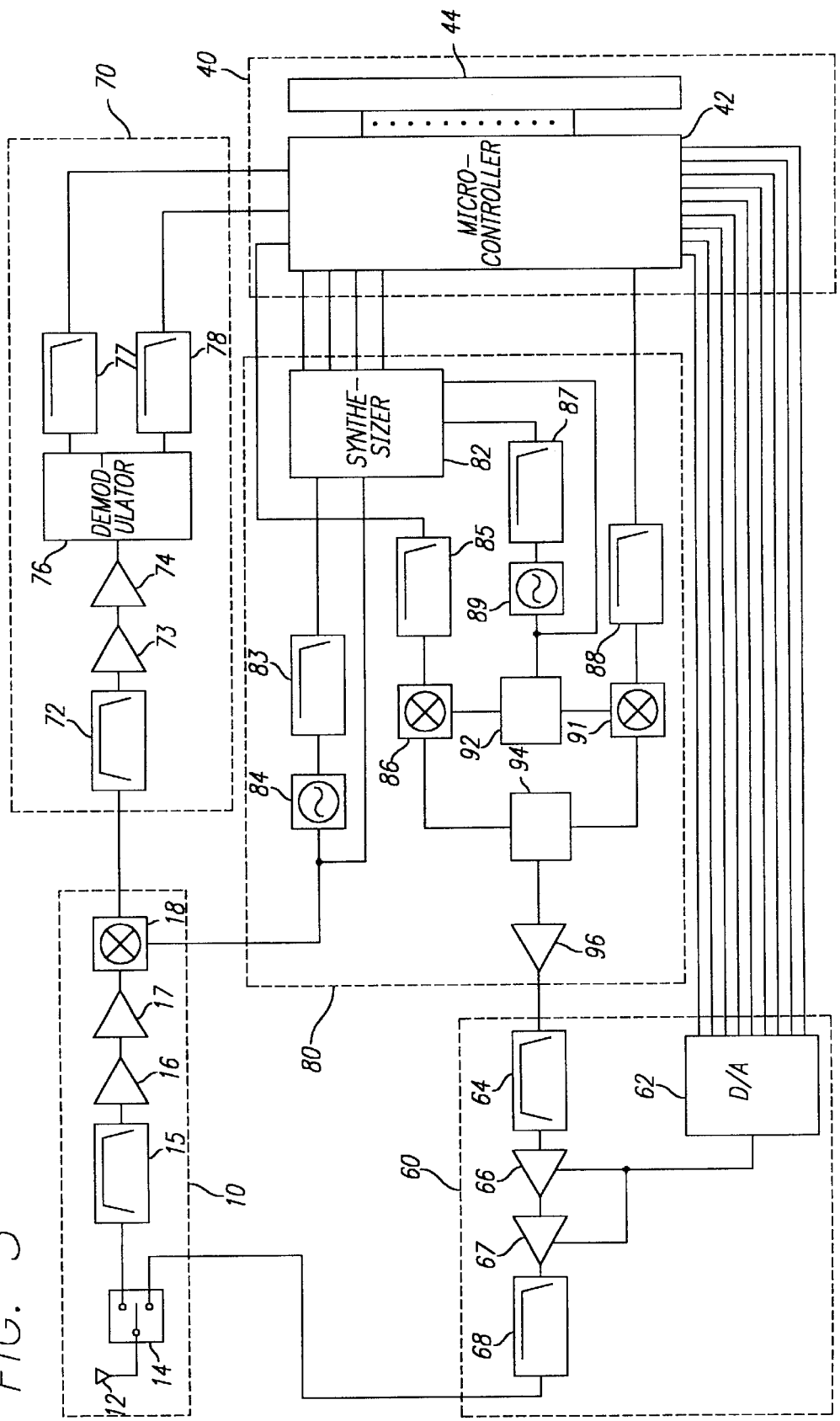
FIG. 3 is a block diagram illustrating a second embodiment of a multi-mode radio receiver/transmitter adapted for direct sequence spread spectrum communication.

FIG. 3 illustrates an alternative embodiment of the multi-mode RF receiver/transmitter in the multi-mode computing device 6 which is adapted to communicate both narrowband RF signals and wideband direct sequence spread spectrum RF signals. The multi-mode RF receiver/transmitter of FIG. 3 includes an RF receive section 10, a demodulation section 70, a digital control section 40, a synthesizer section 80 and a transmit section 60. The RF receive section 10, digital control section 40 and transmit section 60 of FIG. 3 are substantially the same as the corresponding sections of the multi-mode RF receiver/transmitter of FIG. 2, and further description of these sections is therefore omitted.

Following the RF receive section 10, the IF signal is provided to the demodulation section 70 which recovers the information contained within the original RF signal. The demodulation section 70 comprises a bandpass filter 72, an IF amplifier 73, an IF limiter 74, a demodulator 76, and a narrowband and a wideband data low pass filter 77, 78. The bandpass filter 72 has a bandwidth sufficient for reception of wideband direct sequence spread spectrum signals. The IF amplifier 73 and IF limiter 74 are used to adjust the signal level of the filtered IF signal to a level sufficient for demodulation. As in the previous embodiment, the gain of these stages may be set at different levels depending on whether the received RF signal is a wideband or narrowband signal.

The demodulator 76 is adapted to recover binary phase shift key (BPSK) modulated signals from a direct sequence spread spectrum wideband signal and frequency modulation (FM) from a synchronous narrowband signal. The demodulator 76 may further comprise a conventional QPSK demodulator circuit which provides an in phase (I) output and a quadrature (Q) output. By modulating the direct sequence spread spectrum data using BPSK modulation, the Q channel output provides the demodulated BPSK data through the associated wideband filter 78 and the I channel output provides the demodulated FM signal through the associated narrowband filter 77. This way, a single demodulator circuit could be utilized to demodulate both wideband and narrowband signals without having to switch filters as in the previous embodiment.

The synthesizer section 80 communicates with the digital control section 40 to control the timing and selection of carrier frequencies. On the receive side, the synthesizer section 80 comprises a frequency synthesizer 82, a receive loop filter 83 and a receive local oscillator 84. As in the previous embodiment, the frequency synthesizer 82 is programmed by a plurality of digital data signals from the microcontroller 42, and provides a D.C. voltage signal to the receive local oscillator 84 that corresponds to a selected frequency. The oscillating signal from the receive local oscillator 84 is provided back to the frequency synthesizer 82 as a feedback signal, and the receive loop filter 87 comprises a low pass filter that removes high frequency noise from the D.C. voltage signal that occurs in the feedback loop.

On the transmit side, the synthesizer section further comprises a transmit loop filter 87, a transmit local oscillator 89, an I-channel data low pass filter 85, a Q-channel data low pass filter 88, an I-channel mixer 86, a Q-channel mixer 91, a phase shift circuit 92 and a summing circuit 94. The frequency synthesizer 82 provides a D.C. voltage signal to the transmit local oscillator 89 to provide an oscillating signal, which is in turn provided back to the frequency synthesizer as a feedback signal. The oscillating signal from the transmit local oscillator 89 is provided to the phase shift circuit 92, which provides the oscillating signal to the I-channel mixer 86 and shifts the phase of the oscillating signal by 90° and provides the phase-shifted oscillating signal to the Q-channel mixer 91. I-channel data (i.e., narrowband data) and Q-channel data (i.e., wideband data) generated by the digital control section 40 is provided through the respective filters 85, 88 to the respective mixers 86, 91. The Q-channel data low pass filter 88 has a wider bandwidth than the I-channel data low pass filter 85 with a frequency cutoff consistent with the required direct sequence spread spectrum data format. The mixers 86, 91 modulate the I and Q-channel data with the respective oscillating signals, and these modulated data signals are summed by the summing device 94. Lastly, the modulated oscillating signal from the summing device 94 passes through a VCO buffer amplifier 96, and is provided to the transmit section 60.

In the wideband mode (i.e., direct sequence spread spectrum communication), the receiver/transmitter operates as an ordinary direct sequence spread spectrum radio. The digital control section 40 controls the transmit and receive operation, using data from the wideband filter 78, programs the synthesizer 82 for the desired channel frequency, and outputs the proper spreading sequence data to the synthesizer section 80 for transmit on the Q-channel. In the narrowband mode, the operation is the same, except that at the time interval defined by the beacon signal the receiver/transmitter is placed in the narrowband mode. The digital control section 40 selects the data from the narrowband filter 77 for reception of narrowband data. When transmitting, the digital control section 40 outputs data of a lower data rate onto the I-channel only, creating a signal of narrower bandwidth than the direct sequence spread spectrum signal.

Having thus described a preferred embodiment of a multi-mode radio frequency network, it should be apparent to those skilled in the art that certain advantages have been achieved. It should also be appreciated that various modifications, adaptations, and alternative embodiments thereof may be made within the scope and spirit of the present invention The invention is solely defined by the following claims.

What is claimed is:

1. A multi-mode radio frequency network, comprising:
   at least one of a data collection device and a data storage/retrieval device;
   at least one first type of computing device having a first radio receiver/transmitter adapted for communication over a narrowband frequency range;
   at least one second type of computing device having a second radio receiver/transmitter adapted for communication over both said narrowband frequency range and a wideband frequency range; and
   a network access controller including at least one access point, said controller adapted for communication with said at least one first type of computing device and said at least one second type of computing device over respective ones of said narrowband and said wideband frequency ranges, said network access controller providing periodic beacon signals via said access point for coordinating timing of communications over said narrowband and said wideband frequency ranges, said periodic beacon signals including a start period for beginning RF communication, a synchronous communication period and an asynchronous communication period,
   wherein said at least one second type of computing device communicates with said at least one first type of computing device, said at least one of a data collection device and data storage/retrieval device during said synchronous communication period and said at least one second type of computing device communicates with said access point during said asynchronous communication period.

2. The multi-mode radio frequency network of claim 1, wherein said second radio receiver/transmitter provides spread spectrum communication signals over said wideband frequency range.

3. The multi-mode radio frequency network of claim 2, wherein said spread spectrum communication signals further comprise frequency-hopping spread spectrum signals.

4. The multi-mode radio frequency network of claim 2, wherein said spread spectrum communication signals further comprise direct sequence spread spectrum signals.

5. The multi-mode radio frequency network of claim 1, wherein said wideband frequency range communications occur in a substantially asynchronous manner.

6. The multi-mode radio frequency network of claim 1, wherein said narrowband frequency range communications occur in a substantially synchronous manner.

7. The multi-mode radio frequency network of claim 1, further comprising at least one data storage/retrieval device adapted for communication with each of said at least one first type of computing device and said at least one second type of computing device over said narrowband frequency range.

8. The multi-mode radio frequency network of claim 1, further comprising at least one data collection device adapted for communication with said at least one first type of computing device and said at least one second type of computing device over said narrowband frequency range.

9. The multi-mode radio frequency network of claim 1, wherein said second radio receiver/transmitter further comprises an intermediate frequency portion having a wideband filter, a narrowband filter, and means for switching between said wideband and narrowband filters based upon said synchronization signals.

10. The multi-mode radio frequency network of claim 1, wherein said second radio receiver/transmitter further comprises:
    a receive section adapted to receive radio frequency (RF) signals over said wideband and said narrowband frequency ranges and having a dowconversion mixer to mix the RF signals with a frequency-shifted carrier signal to downconvert the RF signals to intermediate frequency (IF) signals;
    an IF filter section adapted to receive said IF signals and having a wideband bandpass filter and a narrowband bandpass filter that are alternatively coupled to said IF signals to provide filtered IF signals;
    a demodulation section adapted to receive said filtered IF signals and recover wideband and narrowband receive signals therefrom;
    a synthesizer section adapted to generate said frequency-shifted carrier for said receive section, said frequency-shifted carrier being further modulated by wideband and narrowband transmit data signals to provide modulated transmit signals; and
    a transmit section adapted to transmit said modulated transmit signals.

11. The multi-mode radio frequency network of claim 10, further comprising a control section adapted to select between said wideband bandpass filter and said narrowband bandpass filter.

12. The multi-mode radio frequency network of claim 1, wherein said second radio receiver/transmitter further comprises:

a receive section adapted to receive radio frequency (RF) signals and having a downconversion mixer to mix the RF signals with a carrier signal to downconvert the RF signals to intermediate frequency (IF) signals;

a demodulation section adapted to receive said filtered IF signals and provide in-phase and quadrature receive data signals therefrom;

a synthesizer section adapted to generate said carrier for said receive section, said carrier being further modulated by in-phase and quadrature transmit data signals;

a transmit section adapted to transmit said modulated transmit signals; and a control section adapted to control switching between wideband and narrowband modes of said second radio receiver/transmitter, wherein said in-phase and quadrature receive signals comprise wideband data in said wideband mode of said second radio receiver/transmitter, and said in-phase receive signals comprising narrowband data in said narrowband mode of said second radio receiver/transmitter.

13. The multi-mode radio frequency network of claim 12, wherein said demodulation section further comprises a demodulator adapted to recover frequency modulation (FM) from said narrowband data and quadrature phase shift key (QPSK) modulation from said wideband data.

14. The multi-mode radio frequency network of claim 12, wherein said wideband data further comprises direct sequence spread spectrum data.

15. An apparatus for communicating in both narrowband and wideband frequency ranges with other types of communication devices over a multi-mode radio frequency network, said network having a network access controller that provides periodic beacon signals including a synchronous communication period and asynchronous communication period, comprising:

a receive section adapted to receive radio frequency (RF) signals and having a downconversion mixer to mix the RF signals with a frequency-shifted carrier signal to downconvert the RF signals to intermediate (IF) signals;

an IF filter section adapted to receive said IF signals and having a wideband bandpass filter and a narrowband bandpass filter that are alternatively coupled to said IF signals to provide filtered IF signals;

a demodulation section adapted to receive said filtered IF signals and recover wideband and narrowband receive signals therefrom;

a synthesizer section adapted to generate said frequency-shifted carrier for said receive section, said frequency-shifted carrier being further modulated by wideband and narrowband transmit data signals to provide modulated transmit signals; and a transmit section adapted to transmit said modulated transmit signals, wherein said apparatus communicates with said other types of communication devices during respective ones of said synchronous and asynchronous communication periods.

16. The apparatus of claim 15, wherein said demodulation section further comprises a demodulator adapted to recover frequency modulation (FM) from said narrowband signals and frequency shift key (FSK) modulation from said wideband signals.

17. An apparatus for communicating in both narrowband and wideband frequency ranges with other types of communication devices over a multi-mode radio frequency network, said network having a network access controller that provides periodic beacon signals including a synchronous communication period and asynchronous communication period, comprising:

a receive section adapted to receive radio frequency (RF) signals and having a downconversion mixer to mix the RF signals with a carrier signal to downconvert the RF signals to intermediate frequency (IF) signals;

a demodulation section adapted to receive said filtered IF signals and provide in-phase and quadrature receive data signals therefrom;

a synthesizer section adapted to generate said carrier for said receive section, said carrier being further modulated by in-phase and quadrature transmit data signals;

a transmit section adapted to transmit said modulated transmit signals; and a control section adapted to control switching between wideband and narrowband modes of said apparatus, wherein said in-phase and quadrature receive signals comprise wideband data in said wideband mode of the apparatus, and said in-phase receive signals comprising narrowband data in said narrowband mode of the apparatus, wherein said apparatus communicates with said other types of communication devices during respective ones of said synchronous and asynchronous communication periods.

18. The apparatus of claim 17, wherein said demodulation section further comprises a demodulator adapted to recover frequency modulation (FM) from said narrowband data and quadrature phase shift key (QPSK) modulation from said wideband data.

19. The apparatus of claim 17, wherein said wideband data further comprises direct sequence spread spectrum data.

* * * * *